(12) United States Patent
Heinz et al.

(10) Patent No.: US 7,874,473 B2
(45) Date of Patent: Jan. 25, 2011

(54) METHOD FOR THE SOLDERING REPAIR OF A COMPONENT IN A VACUUM AND AN ADJUSTED PARTIAL OXYGEN PRESSURE

(75) Inventors: Paul Heinz, Erlangen (DE); Robert Singer, Erlangen (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 12/529,707

(22) PCT Filed: Feb. 15, 2008

(86) PCT No.: PCT/EP2008/051829

§ 371 (c)(1),
(2), (4) Date: Sep. 2, 2009

(87) PCT Pub. No.: WO2008/107282

PCT Pub. Date: Sep. 12, 2008

(65) Prior Publication Data

US 2010/0108745 A1     May 6, 2010

(30) Foreign Application Priority Data

Mar. 6, 2007   (EP)  .................................. 07004599

(51) Int. Cl.
*B23K 31/02*     (2006.01)
*B23P 6/00*     (2006.01)

(52) U.S. Cl. ........................ 228/119; 228/219; 228/221; 29/889.1

(58) Field of Classification Search ...................... None
See application file for complete search history.

(56) References Cited

U.S. PATENT DOCUMENTS 4,505,418 A * 3/1985 Neidig et al. ............ 228/122.1

(Continued)

FOREIGN PATENT DOCUMENTS

DE     1790745 A1 * 5/2007

(Continued)

*Primary Examiner*—Kiley Stoner
(74) *Attorney, Agent, or Firm*—Crowell & Moring LLP

(57) ABSTRACT

A method for the repair of a component by a solder is disclosed. The method is performed under specifically selected vacuum conditions in order to prevent oxidation and vaporization.

16 Claims, 4 Drawing Sheets

U.S. PATENT DOCUMENTS

| | | | |
|---|---|---|---|
| 4,514,751 A * | 4/1985 | Bhattacharya | 257/737 |
| 4,542,493 A * | 9/1985 | Takehara | 369/126 |
| 4,789,412 A | 12/1988 | Nakamura et al. | |
| 4,821,947 A * | 4/1989 | Nowotarski | 228/219 |
| 4,908,185 A | 3/1990 | Plough, Jr. | |
| 4,910,098 A | 3/1990 | Lee et al. | |
| 4,913,752 A * | 4/1990 | Falk | 148/336 |
| 4,915,903 A | 4/1990 | Brupbacher et al. | |
| 4,925,829 A * | 5/1990 | Fujita et al. | 505/473 |
| 5,096,110 A * | 3/1992 | Schmatz et al. | 228/102 |
| 5,121,875 A | 6/1992 | Hagerty et al. | |
| 5,364,011 A * | 11/1994 | Baker et al. | 228/180.21 |
| 5,529,805 A * | 6/1996 | Iacovangelo et al. | 427/249.18 |
| 5,565,401 A * | 10/1996 | Le Page et al. | 502/439 |
| 5,766,404 A * | 6/1998 | Rigali et al. | 156/345.54 |
| 5,836,505 A * | 11/1998 | Chaumat et al. | 228/121 |
| 5,993,980 A | 11/1999 | Schmitz et al. | |
| 5,998,043 A * | 12/1999 | Sasaki et al. | 428/627 |
| 6,024,792 A | 2/2000 | Kurz et al. | |
| 6,143,099 A * | 11/2000 | Maus et al. | 148/530 |
| 6,435,401 B1 * | 8/2002 | Miitsu et al. | 228/264 |
| 6,471,115 B1 * | 10/2002 | Ijuin et al. | 228/180.22 |
| 6,616,032 B1 * | 9/2003 | Gasse et al. | 228/248.1 |
| 6,814,544 B2 * | 11/2004 | Tsukamoto et al. | 416/96 R |
| 7,318,547 B2 * | 1/2008 | Gasse | 228/247 |
| 2001/0039725 A1 * | 11/2001 | Katayama et al. | 29/832 |
| 2003/0201308 A1 * | 10/2003 | Palmgren | 228/122.1 |
| 2004/0035519 A1 * | 2/2004 | Beroz et al. | 156/85 |
| 2006/0016527 A1 * | 1/2006 | Yoshioka et al. | 148/671 |
| 2006/0237231 A1 * | 10/2006 | Hata et al. | 174/521 |
| 2007/0039177 A1 * | 2/2007 | Yoshioka et al. | 29/889.1 |
| 2007/0231664 A1 * | 10/2007 | Zerfass et al. | 429/36 |
| 2007/0251391 A1 * | 11/2007 | Thomas | 96/135 |
| 2008/0020936 A1 * | 1/2008 | Ayai | 505/425 |
| 2009/0255981 A1 * | 10/2009 | Singer et al. | 228/119 |
| 2009/0283572 A1 * | 11/2009 | Volek | 228/119 |
| 2010/0000976 A1 * | 1/2010 | Ott et al. | 219/121.17 |
| 2010/0025454 A1 * | 2/2010 | Heinz et al. | 228/119 |

FOREIGN PATENT DOCUMENTS

| | | |
|---|---|---|
| EP | 0 412 397 B1 | 2/1991 |
| EP | 0 486 489 B1 | 5/1992 |
| EP | 0 549 398 A1 | 6/1993 |
| EP | 0 786 017 B1 | 7/1997 |
| EP | 0 892 090 B1 | 1/1999 |
| EP | 1 204 776 B1 | 5/2002 |
| EP | 1 306 454 B1 | 5/2003 |
| EP | 1 319 729 B1 | 6/2003 |
| EP | 1 486 286 A2 | 12/2004 |
| EP | 1 764 182 A1 | 3/2007 |
| JP | 59-141395 A * | 8/1984 |
| JP | 3-128172 A * | 5/1991 |
| JP | 2006-134662 | 5/2006 |
| WO | WO 99/67435 | 12/1999 |
| WO | WO 00/44949 | 8/2000 |
| WO | WO 2007/031400 A1 | 3/2007 |

* cited by examiner

FIG 5

| Werkstoff | C | Cr | Ni | Co | Mo | W | Ta | Nb | Al | Ti | B | Zr | Hf |
|---|---|---|---|---|---|---|---|---|---|---|---|---|---|
| Ni-Basis-Feingußlegierungen | | | | | | | | | | | | | |
| GTD 222 | 0.10 | 22.5 | Rest | 19.0 | | 2.0 | 1.0 | | 1.2 | 2.3 | 0.008 | | |
| IN 939 | 0.15 | 22.4 | Rest | 19.0 | | 2.0 | 1.4 | 1.0 | 1.9 | 3.7 | 0.009 | 0.10 | |
| IN 6203 DS | 0.15 | 22.0 | Rest | 19.0 | | 2.0 | 1.1 | 0.8 | 2.3 | 3.5 | 0.010 | 0.10 | 0.75 |
| Udimet 500 | 0.10 | 18.0 | Rest | 18.5 | 4.0 | | | | 2.9 | 2.9 | 0.006 | 0.05 | |
| IN 738 LC | 0.10 | 16.0 | Rest | 8.5 | 1.7 | 2.6 | 1.7 | 0.9 | 3.4 | 3.4 | 0.010 | 0.10 | |
| SC 16 | <0.01 | 16.0 | Rest | | 3.0 | | 3.5 | | 3.5 | 3.5 | <0.005 | <0.008 | |
| Rene 80 | 0.17 | 14.0 | Rest | 9.5 | 4.0 | 4.0 | | | 3.0 | 5.0 | 0.015 | 0.03 | |
| GTD 111 | 0.10 | 14.0 | Rest | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rest | 9.0 | 1.9 | 4.1 | 4.1 | | 3.4 | 3.8 | 0.015 | 0.02 | 1.00 |
| IN 792 DS | 0.08 | 12.5 | Rest | 9.0 | 1.9 | 4.1 | 4.1 | | 3.4 | 3.8 | 0.015 | 0.02 | 1.00 |
| MAR M 002 | 0.15 | 9.0 | Rest | 10.0 | | 10.0 | 2.5 | | 5.5 | 1.5 | 0.015 | 0.05 | 1.50 |
| MAR M 247 LC DS | 0.07 | 8.1 | Rest | 9.2 | 0.5 | 9.5 | 3.2 | | 5.6 | 0.7 | 0.015 | 0.02 | 1.40 |
| CMSX-2 | <.006 | 8.0 | Rest | 4.6 | 0.6 | 8.0 | 6.0 | | 5.6 | 1.0 | <.003 | <.0075 | 0.10 |
| CMSX-3 | <.006 | 8.0 | Rest | 4.6 | 0.6 | 8.0 | 6.0 | | 5.6 | 1.0 | <.003 | <.0075 | 0.10 |
| CMSX-4 | | 6.0 | Rest | 10.0 | 0.6 | 6.0 | 6.0 | | 5.6 | 1.0 | | Re=3.0 | 0.10 |
| CMSX-6 | <.015 | 10.0 | Rest | 5.0 | 3.0 | <.10 | 2.0 | <.10 | 4.9 | 4.8 | <.003 | <.0075 | 0.10 |
| PWA 1480 SX | <.006 | 10.0 | Rest | 5.0 | | 4.0 | 12.0 | | 5.0 | 1.5 | <.0075 | <.0075 | |
| PWA 1483 SX | 0.07 | 12.2 | Rest | 9.0 | 1.9 | 3.8 | 5.0 | | 3.6 | 4.2 | 0.0001 | 0.002 | |
| Co-Basis-Feingußlegierungen | | | | | | | | | | | | | |
| FSX 414 | 0.25 | 29.0 | 10 | Rest | | 7.5 | | | | | 0.010 | | |
| X 45 | 0.25 | 25.0 | 10 | Rest | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rest | | 7.5 | 4 | | | 0.3 | 0.010 | 0.60 | |
| CM 247 | 0.07 | 8.3 | Rest | 10.0 | 0.5 | 9.5 | 3.2 | | 5.5 | 0.7 | | | 1.5 | chemische Zusammensetzung in %

METHOD FOR THE SOLDERING REPAIR OF A COMPONENT IN A VACUUM AND AN ADJUSTED PARTIAL OXYGEN PRESSURE

This application claims the priority of International Application No. PCT/EP2008/051829, filed Feb. 15, 2008, and European Patent Document No. 07004599.2, filed Mar. 6, 2007, the disclosures of which are expressly incorporated by reference herein.

BACKGROUND AND SUMMARY OF THE INVENTION

The invention relates to a method for the soldering repair of a component in a vacuum.

Components must sometimes be repaired after manufacturing, for example, after casting or after they have been in use and have formed cracks. There are various repair methods for this such as, for example, the welding method, in which, however, a substrate material of the component must be co-fused, which can produce damage in particular to cast and directionally solidified components, and lead to vaporization of constituents of the substrate material. A soldering method operates at lower temperatures as compared to the temperature in the welding method and thus as compared to the melting temperature of the substrate material. Despite this, the solder should possess a high strength so that the crack filled with solder or the depression does not produce a weakening of the overall component at high operating temperatures.

U.S. Pat. Nos. 4,908,185; 5,993,980; 4,913,752; 4,915,903 as well as 4,789,412 disclose the addition of additives.

Therefore, the objective of the invention is disclosing a method for repairing a component wherein oxidation and vaporization are avoided.

Preferably used solder alloys are disclosed in Application PCT/EP2006/065753.

The solder alloy 10 of PCT/EP2006/065753 is preferably nickel-based and has the additional constituents of chromium, cobalt and tungsten as well as 2% by weight to 22.4% by weight of a melting point reducer, which features at least one element from the group of scandium (Sc), aluminum (Al), titanium (Ti), zirconium (Zr) or tantalum (Ta). The percentages of chromium are preferably 7.5% to 11% by weight and in particular, 10% by weight. The percentages of cobalt are preferably between 8% and 11.4% by weight and in particular, 10.4% by weight.

The percentages of tungsten are preferably at 2.8% by weight to 6.9% by weight and in particular, at 3.8% by weight or 5.9% by weight. In addition, up to 1.9% by weight, in particular, 1.9% by weight, molybdenum (Mo) can be added to the solder alloy. Additional elements may be present, but the above listing of nickel, chromium, cobalt, tungsten, the melting point reducer and the optional molybdenum is preferably definitive. The solder preferably does not contain any boron, any silicon or even any hafnium. The additional of rhenium can also preferably be dispensed with. Likewise, no carbon is preferably used.

The solder 10 can be connected to the substrate 4 of the component 1, 120, 130, 155 in an isothermal or a temperature-gradient method. A gradient method is then offered if the substrate 4 has a directional structure, for example, a SX or DS structure so that the solder 10 subsequently has a directional structure. Likewise, the component 1 does not need to have a directionally solidified structure (but a CC structure), wherein, due to the directionally solidified structure in the repaired location 3, a high strength of the component 1 is achieved at high temperatures, because the directionally solidified structure of the solder 10 in the repaired location compensates for the negative effect of the low melting point on the mechanical strength at high temperatures.

When fusing (isothermal method or with gradient method), an inert gas is preferably used, in particular, argon, which reduces the chromium vaporization from the substrate 4 at high temperatures or a reducing gas (argon/hydrogen) is used. The solder 10 may also be applied on a large-scale on a surface of a component 1, 120, 130, 155 in order to achieve a thickening of the substrate 4, in particular in the case of hollow components. The solder 10 is preferably used to fill cracks 7 or depressions 7. The table depicts the exemplary inventive compositions HT of the solder alloy of the solder 10 (in % by weight), wherein the remainder is nickel.

| Alloy | Cr | Co | Mo | W | Ta | Al | Ti | Zr | Sc |
|---|---|---|---|---|---|---|---|---|---|
| HT1 | 10 | 9 | 0 | 3.8 | 3 | 3 | 0 | 13.4 | 0 |
| HT2 | 10 | 9 | 1.9 | 3.8 | 0 | 3 | 0 | 13.4 | 0 |
| HT3 | 10 | 9 | 0 | 5.9 | 0 | 3 | 0 | 13.4 | 0 |
| HT4 | 10 | 9 | 0 | 3.8 | 3 | 0 | 3 | 13.4 | 0 |
| HT5 | 10 | 9 | 1.9 | 3.8 | 0 | 0 | 3 | 13.4 | 0 |
| HT6 | 10 | 9 | 0 | 3.8 | 0 | 0 | 0 | 0 | 8 |
| HT7 | 10 | 9 | 0 | 3.8 | 3 | 0 | 0 | 0 | 10 |
| HT8 | 10 | 9 | 0 | 3.8 | 0 | 0 | 0 | 0 | 6 |
| HT9 | 10 | 9 | 0 | 3.8 | 0 | 0 | 3 | 13.4 | 0 |
| HT10 | 10 | 9 | 0 | 3.8 | 0 | 3 | 0 | 13.4 | 0 |
| HT11 | 8.5 | 10.4 | 0 | 4.4 | 0 | 0 | 0 | 13.4 | 0 |
| HT12 | 8.5 | 10.4 | 0 | 4.4 | 0 | 0 | 0 | 13.4 | 0.5 |
| HT13 | 10 | 9 | 0 | 3.8 | 0 | 0 | 0 | 0 | 10 |
| HT14 | 8.5 | 9 | 1.9 | 3.8 | 0 | 3 | 3 | 13.4 | 0 |
| HT15 | 8.5 | 10 | 0 | 3.8 | 0 | 0 | 3 | 0 | 0 |
| HT16 | 10 | 9 | 0 | 3.8 | 0 | 3 | 3 | 0 | 0 |
| HT17 | 10 | 9 | 0 | 3.8 | 3 | 3 | 0 | 0 | 0 |
| HT18 | 10 | 9 | 1.9 | 3.8 | 0 | 3 | 3 | 0 | 0.5 |
| HT19 | 10 | 10 | 1.9 | 5.9 | 0 | 0 | 3 | 13.4 | 0 |
| HT20 | 10 | 9 | 1.9 | 5.9 | 3 | 3 | 0 | 13.4 | 0 |
| HT21 | 10 | 10 | 1.9 | 3.8 | 3 | 3 | 3 | 13.4 | 0 |
| HT22 | 10 | 9 | 0 | 3.8 | 0 | 3 | 0 | 0 | 6 |
| HT23 | 10 | 9 | 1.9 | 5.9 | 0 | 0 | 0 | 0 | 2 |
| HT24 | 10 | 9 | 1.9 | 3.8 | 0 | 0 | 0 | 13.4 | 2 |
| HT25 | 10 | 9 | 1.9 | 3.8 | 0 | 0 | 0 | 13.4 | 4 |
| HT26 | 10 | 9 | 1.9 | 3.8 | 0 | 0 | 0 | 13.4 | 0 |
| HT27 | 8 | 9 | 1.9 | 1.8 | 5 | 3.6 | 4.1 | 14 hafnium | 0 |

The solder alloys can be preferably divided into four segments with respect to the composition of the melting point reducer made of Zr, Al, Ti, Ta and Sc: The first segment contains at least zirconium, the second has at least scandium, a third segment does not contain any zirconium and any scandium, and a fourth segment has zirconium, aluminum, titanium, tantalum with small percentages of scandium (up to 2% by weight).

The first segment is made either of only zirconium or only of zirconium, aluminum, titanium and tantalum or only of zirconium and two other elements from the group of aluminum, titanium, tantalum or only of zirconium with an element from the group of aluminum, titanium, tantalum.

Using titanium, aluminum and/or zirconium is especially advantageous, because these elements promote the formation of the γ' phase in a nickel-based material, which improves the mechanical high-temperature properties. In this case, one, two or three of these three elements may be used advantageously in the solder 10 (see HT5, HT9, HT10, HT14, HT19).

The second segment is made either only of scandium or only of scandium, aluminum, titanium and tantalum or only of scandium and two elements of the group of aluminum, titanium or tantalum or only of scandium and one element from the group of aluminum, titanium, tantalum.

The third segment is made of at least one element from the group of aluminum, titanium or tantalum and does not contain any zirconium or any scandium, wherein a first example of the third segment with the three elements of the group of aluminum, titanium and tantalum is described. Likewise, the melting point reducer may contain two elements from the group of aluminum, titanium or tantalum or only one element from the group of aluminum, titanium or tantalum is used.

The fourth segment is made of zirconium, small percentages (to 2% by weight) of scandium and up to three elements from the group of aluminum, titanium and tantalum:

Zr+Sc+3 from (Al, Ti, Ta);

Zr+Sc+2 from (Al, Ti, Ta); and

Zr+Sc+1 from (Al, Ti, Ta).

The following have been proven to be the best solder alloys: HT1-HT13.

Likewise, a preferred solder alloy may not have any chromium. Likewise, preferred values for chromium may lie in the range of 4.0% by weight to less than 7.5% by weight. Another preferred range is represented by a percentage of greater than 11% by weight to greater than 12% by weight chromium.

No cobalt is also preferably used for the solder alloy.

A further advantageous range of values for cobalt lies in a range from 4% by weight to less than 8% by weight.

Likewise, the solder alloy can preferably not contain any tungsten. Values between 1.8% by weight and less than 2.8% by weight also represent preferred values for tungsten.

Rhenium (Re) is also preferably added to the solder alloy, in particular, in a range of 2.5% by weight to 3% by weight.

At least one, in particular, one rare earth element, in particular, yttrium (Y), is also preferably added, and that preferably in a range of values from 0.5% by weight to 2% by weight.

Hafnium is also added, in particular, in a range of values of 0.5% by weight to 2.5% by weight.

The Method and its Parameters

In the case of soldering a solder 10 in a vacuum, something that is done frequently, when the solder 10 or the component 1, 120, 130, 155 oxidizes, because of the use of inert gases (Ar, He, Ar/He, $H_2$, etc.) and/or the use of a vacuum, the problem arises of constituents of the component 1, 120, 130, 155 or of the solder 10 vaporizing at too low a process pressure. An oxidation of the solder 10 or of the component 1, 120, 130, 155 takes place at too high an oxygen partial pressure $p_{O2}$.

The invention method therefore proposes to conduct a soldering method in the vacuum of a processing chamber, preferably in a furnace at a maximum oxygen partial pressure pot of $3.5*10^{-6}$ mbar ($=3.5*10^{-4}$ Pa). The total process pressure is preferably a maximum of 10 mbar (=1000 Pa).

The total process pressure is preferably at least 0.035 mbar (3.5 Pa). The oxygen partial pressure pot is preferably at least $10^{-7}$ mbar ($10^{-5}$ Pa).

The soldering method is particularly preferably conducted at a maximum oxygen partial pressure $p_{O2}$ of $10^{-6}$ mbar ($=10^{-4}$ Pa). The total process pressure is particularly preferably a maximum of 1 mbar (=100 Pa). The total process pressure is particularly preferably at least 0.1 mbar (=10 Pa). The oxygen partial pressure $p_{O2}$ is particularly preferably at least $5*10^{-7}$ mbar ($=5*10^{-5}$ Pa).

These pressure values are achieved particularly in that the processing chamber features a vacuum in the interior and is preferably steadily evacuated and preferably flushed with a pure inert gas (Ar 5.0, preferably Ar 6.0). This preferably takes place for at least 10 hours, in particular, for 48 hours with a flow rate preferably between 0.2 l/min and 1 l/min.

In this case, preferably argon 6.0 is used (representing an oxygen percentage of $5 \times 10^{-7}$ in the process gas), which, however, is preferably filtered through a gas cleaning cartridge so that the content of oxygen and water is reduced by a factor of 100, thereby achieving an oxygen percentage of $5 \times 10^{-9}$ in the process gas, which is introduced into the processing chamber.

Possible soldering methods are explained on the basis of FIG. 1.

BRIEF DESCRIPTION OF THE DRAWINGS

FIG. 5 depicts a list of super alloys.

DETAILED DESCRIPTION OF THE DRAWINGS

Figure 1:
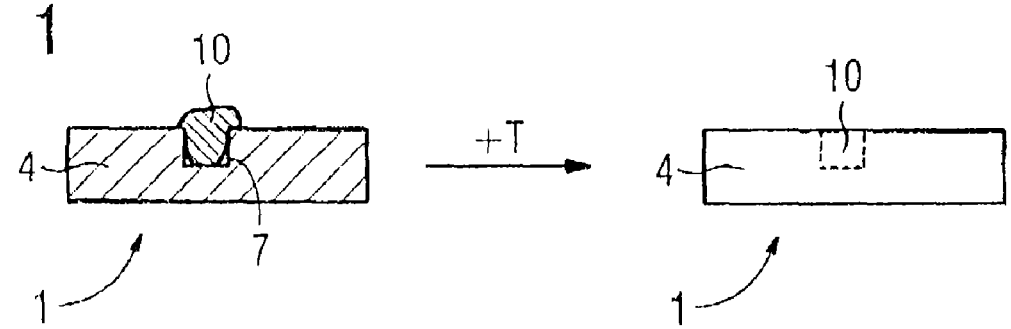
FIG. 1 depicts cross-sectional views of a component during and after a treatment with the inventive solder, FIG. 2 perspectively depicts a turbine blade, FIG. 3 perspectively depicts a combustion chamber.

FIG. 1 depicts a component 1, which is treated with a solder 10 from an inventive solder alloy. The component 1 is comprised of a substrate 4, which, in particular, in the case of components for high-temperature applications, in particular, for turbine blades 120, 130 (FIG. 2) or combustion chamber elements 155 (FIG. 3) for steam or gas turbines 100 (FIG. 4), is made of an iron-based, nickel-based or cobalt-based super alloy. These can preferably be the known materials PWA 1483, PWA 1484 or Rene N5 (see FIG. 5). The solder 10 is also used in blades for aircraft.

The substrate 4 has a crack 7 or a depression 7, which is supposed to be filled up during soldering. The cracks 7 or depressions 7 are preferably approximately 200 μm wide and can be up to 5 mm deep. In this case, the solder 10 from the solder alloy is applied in or in the vicinity of the depression 7 and due to a heat treatment (+T) fuses the solder 10 below a melting temperature of the substrate 4 and completely fills the depression 7.

Figure 2:
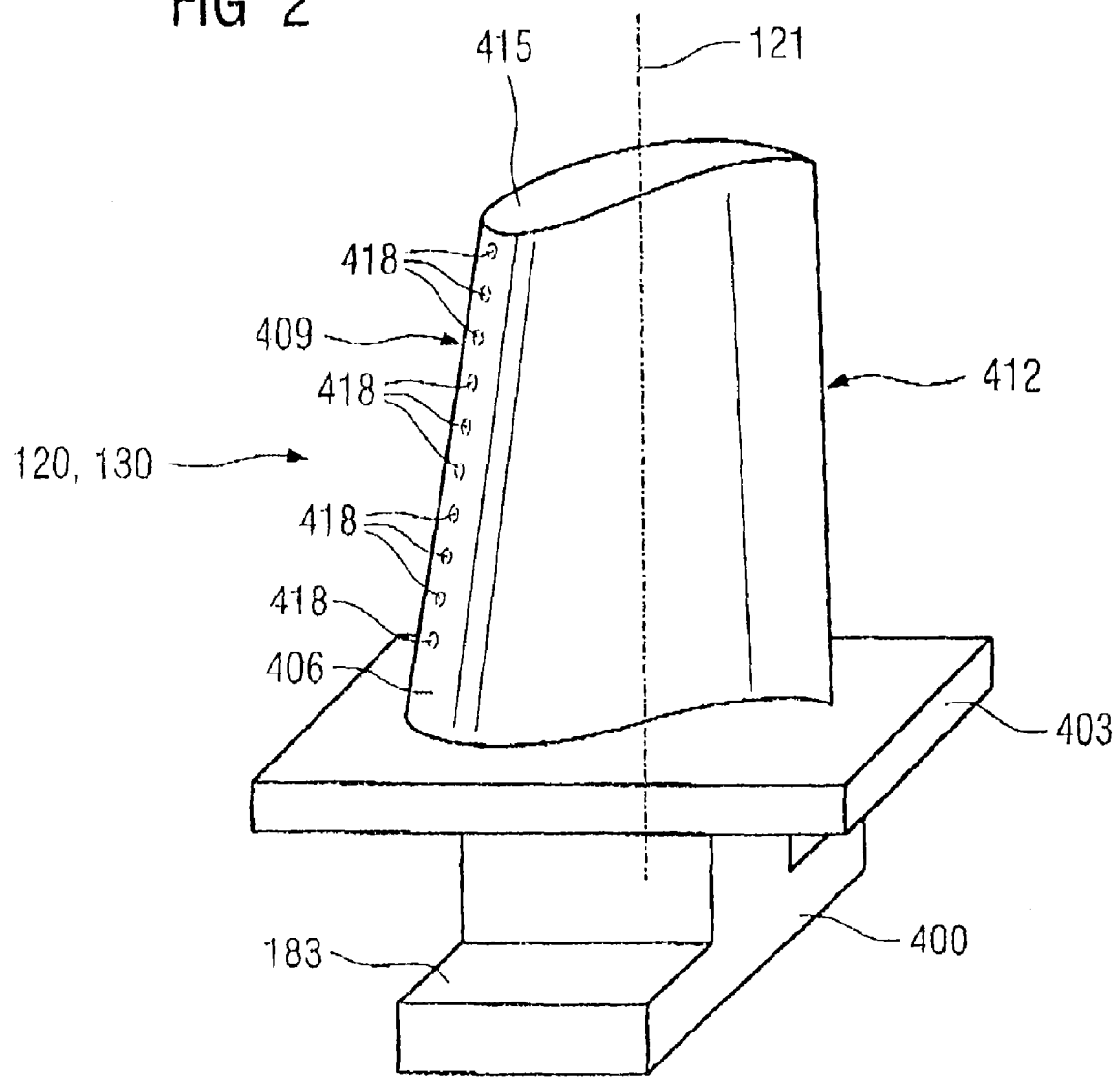

FIG. 2 shows a perspective view of a blade 120 or guide blade 130 of a turbo-machine, which extends along a longitudinal axis 121.

The turbo-machine can be a gas turbine of an aircraft or a power plant to generate electricity, a steam turbine or a compressor.

Along the longitudinal axis 121, the blade 120, 130 features in succession a fastening area 400, an adjoining blade platform 403 as well as a blade pan 406 and a blade tip 415. As the guide blade 130, the blade 130 can have another platform (not shown) on its blade tip 415.

Formed in the fastening area 400 is a blade root 183, which serves to fasten the rotor blades 120, 130 on a shaft or a disk (not shown). The blade root 183 is embodied, for example, as a hammer head. Other embodiments of a Christmas-tree root or dovetail root are possible. The blade 120, 130 features a leading edge 409 and a trailing edge 412 for a medium, which flows past the blade pan 406.

In the case of conventional blades 120, 130, solid metallic materials are used, in particular, super alloys, in all areas 400, 403, 406 of the blade 120, 130. These types of super alloys are known, for example, from EP 1 204 776 B1, EP 1 306 454, EP 1 319 729 A1, WO 99/67435 or WO 00/44949; these documents are part of the disclosure with regard to the chemical composition of the alloy. The blade 120, 130 in this connection may be fabricated by a casting method, also by means of directional solidification, by a forging method, by a milling method or combinations thereof.

In the case of conventional blades 120, 130, solid metallic materials are used, in particular, super alloys, in all areas 400, 403, 406 of the blade 120, 130. These types of super alloys are known, for example, from EP 1 204 776 B1, EP 1 306 454, EP 1 319 729 A1, WO 99/67435 or WO 00/44949; these documents are part of the disclosure with regard to the chemical composition of the alloy. The blade 120, 130 in this connection may be fabricated by a casting method, also by means of directional solidification, by a forging method, by a milling method or combinations thereof.

Fabricating these types of monocrystalline work pieces is accomplished, for example, by directional solidification from the melt. In this case, this is a casting method, in which the liquid metallic alloy is solidified into a monocrystalline structure, i.e., into a monocrystalline work piece, or directionally solidified.

In the process, dendritic crystals are aligned along the thermal flow and form either a column-crystalline grain structure (columnar, i.e., grains that run over the entire length of the work piece and, in this case, according to general language usage, are described as directionally solidified) or a monocrystalline structure, i.e., the entire work piece is comprised of a single crystal. With this method, the transition to globulitic (polycrystalline) solidification must be avoided, because transverse and longitudinal grain boundaries necessarily form through undirected growth, which undo the good properties of the directionally solidified or monocrystalline component.

If the subject consists of directionally solidified structures in general, what is meant is both monocrystals, which do not have any grain boundaries or at most small-angle grain boundaries, as well as column-crystalline structures, which have grain boundaries running possibly in the longitudinal direction, but not any transverse grain boundaries. In terms of the latter crystalline structures, one speaks of directionally solidified structures. These types of methods are known as U.S. Pat. No. 6,024,792 and European Patent Document No. EP 0 892 090 A1; these documents are part of the disclosure with respect to the solidification method.

The blades 120, 130 may likewise feature coatings against corrosion or oxidation, e.g., (MCrAlX; M is at least one element from the group of iron (Fe), cobalt (Co), nickel (Ni); X is an active element and stands for yttrium (Y) and/or silicon and/or at least one element from the rare earths, or hafnium (Hf)). These types of alloys are known as EP 0 486 489 B1, EP 0 786 017 B1, EP 0 412 397 B1 or EP 1 306 454 A1. The density is preferably 95% of the theoretic density. A protective aluminum oxide layer (TGO=thermal grown oxide layer) forms on the MCrAlX layer (as an intermediate layer or as the outermost layer).

The layer composition preferably features Co-30Ni-28Cr-8Al-0, 6Y-0, 7Si or Co-28Ni-24Cr-10Al-0, 6Y. In addition to these cobalt-based protective coatings, nickel-based protective layers are also preferably used, such as Ni-10Cr-12Al-0, 6Y-3Re or Ni-12Co-21Cr-11Al-0, 4Y-2Re or Ni-25Co-17Cr-10Al-0, 4Y-l, 5Re.

A thermal barrier coating can be present on the MCrAlX, which is preferably the outermost layer, and is made, for example, of $ZrO_2$, $Y_2O_3$—$ZrO_2$, i.e., it is not partially or completely stabilized by yttrium oxide and/or calcium oxide and/or magnesium oxide. The thermal barrier coating covers the entire MCrAlX layer. Columnar grains are formed in the thermal barrier coating by using suitable coating methods such as, for example, electron-beam physical vapor deposition (EB-PVD). Other coating methods are conceivable, for example, atmospheric plasma spraying (APS), LPPS, VPS or CVD. The thermal barrier coating can have porous, microcrack or macrocrack-afflicted grains for better resistance to thermal shock. The thermal barrier coating is preferably more porous than the MCrAlX layer.

Refurbishment means that components 120, 130 must possibly be freed of their protective layers after use (e.g., by sand blasting). Afterwards, the corrosion and/or oxidation layers or products are removed. As the case may be, any cracks in the component 120, 130 are also repaired. Then the component 120, 130 is recoated and the component 120, 130 is reused.

The blade 120, 130 can be embodied to be hollow or solid. If the blade 120, 130 is supposed to be cooled, it is hollow and, as the case may be, has film cooling holes 418 (shown with dashed lines).

Figure 3:
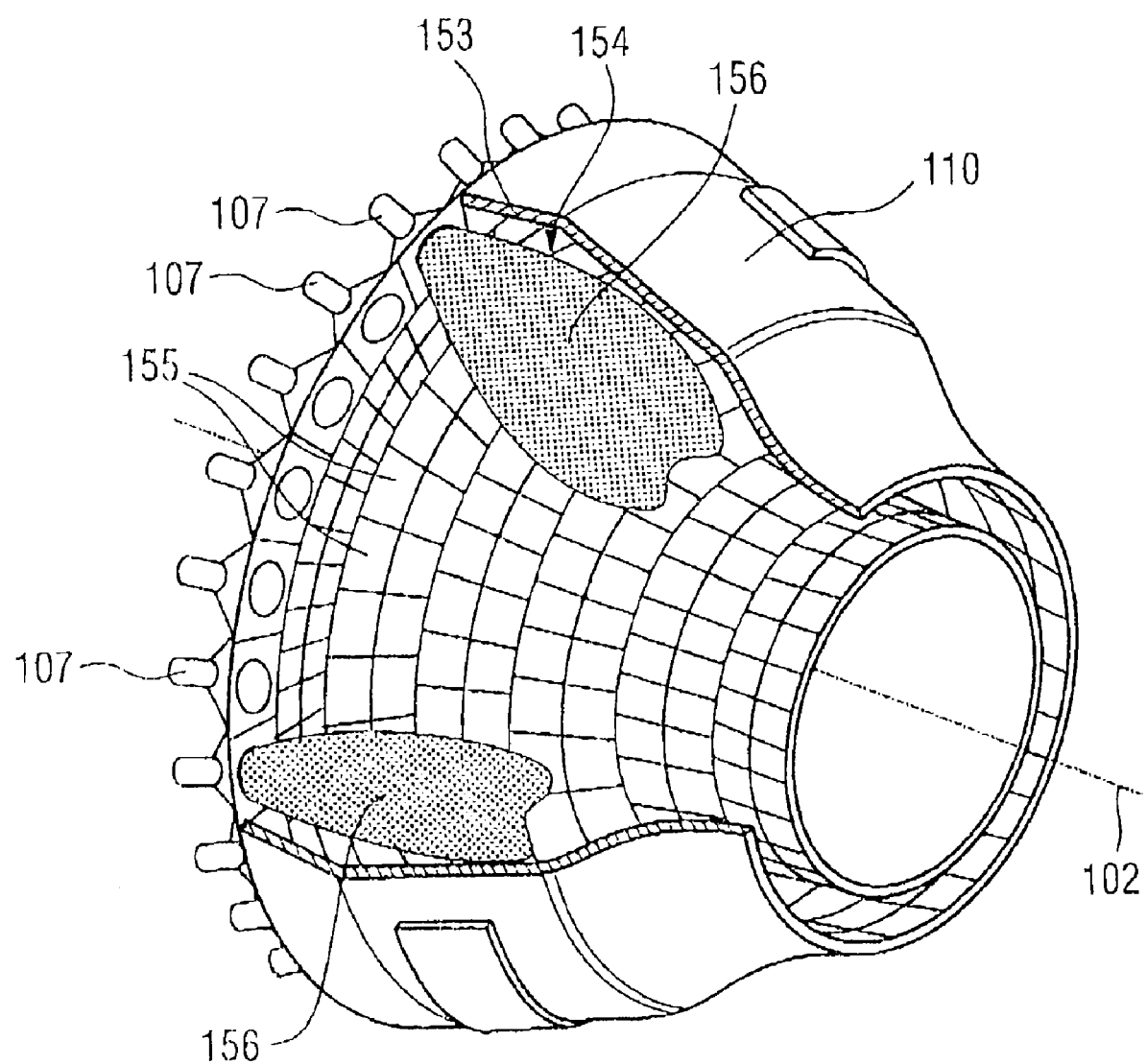

FIG. 3 depicts a combustion chamber 110 of a gas turbine. The combustion chamber 110 is embodied, for example, as a so-called annular combustion chamber, in which a plurality of burners 107 arranged in the circumferential direction around a rotational axis 102 lead into a common combustion chamber area 154, and generate the flames 156. To this end, the combustion chamber 110 is embodied as whole, as an annular structure, which is positioned around the rotational axis 102.

To achieve a comparatively high degree of efficiency, the combustion chamber 110 is designed for a comparatively high temperature of the working medium M of approximately 1000° C. to 1600° C. In order to also make a comparatively long operating duration possible, in the case of these operating parameters which are unfavorable for the materials, the combustion chamber wall 153 is provided on its side facing the working medium M with an inner lining formed from heat shield elements 155. Every heat shield element 155 made of an alloy is equipped on the working-medium-side with an especially heat-resistant protective layer (MCrAlX layer and/or ceramic coating) or is fabricated from high-temperature resistant material (solid ceramic stones). These protective layers can be similar to the turbine blades, i.e., for example, MCrAlX means: M is at least one element from the group of iron (Fe), cobalt (Co), nickel (Ni), X is an active element and stands for yttrium (Y) and/or silicon and/or at least one element from the rare earths, or hafnium (Hf). Such alloys are known as EP 0 486 489 B1, EP 0 786 017 B1, EP 0 412 397 B1 or EP 1 306 454 A1.

A ceramic thermal barrier coating can be present on the MCrAlX and is made, for example, of $ZrO_2$, $Y_2O_3$—$ZrO_2$, i.e., it is not partially or completely stabilized by yttrium oxide and/or calcium oxide and/or magnesium oxide. Columnar grains are formed in the thermal barrier coating by using suitable coating methods such as, for example, electron-beam physical vapor deposition (EB-PVD). Other coating methods are conceivable, for example, atmospheric plasma spraying (APS), LPPS, VPS or CVD. The thermal barrier coating can have porous, microcrack or macrocrack-afflicted grains for better resistance to thermal shock.

Refurbishment means that heat shield elements 155 must possibly be freed of their protective layers after use (e.g., by sand blasting). Afterwards, the corrosion and/or oxidation layers or products are removed. As the case may be, any cracks in the heat shield element 155 are also repaired. Then the heat shield elements 155 are recoated and the heat shield elements 155 are reused.

Because of the high temperatures inside the combustion chamber 110, a cooling system can also be provided for the heat shield elements 155 or for their retaining elements. The heat shield elements 155 are then hollow, for example, and, as the case may be, have cooling holes (not shown) leading into the combustion chamber area 154.

Figure 4:
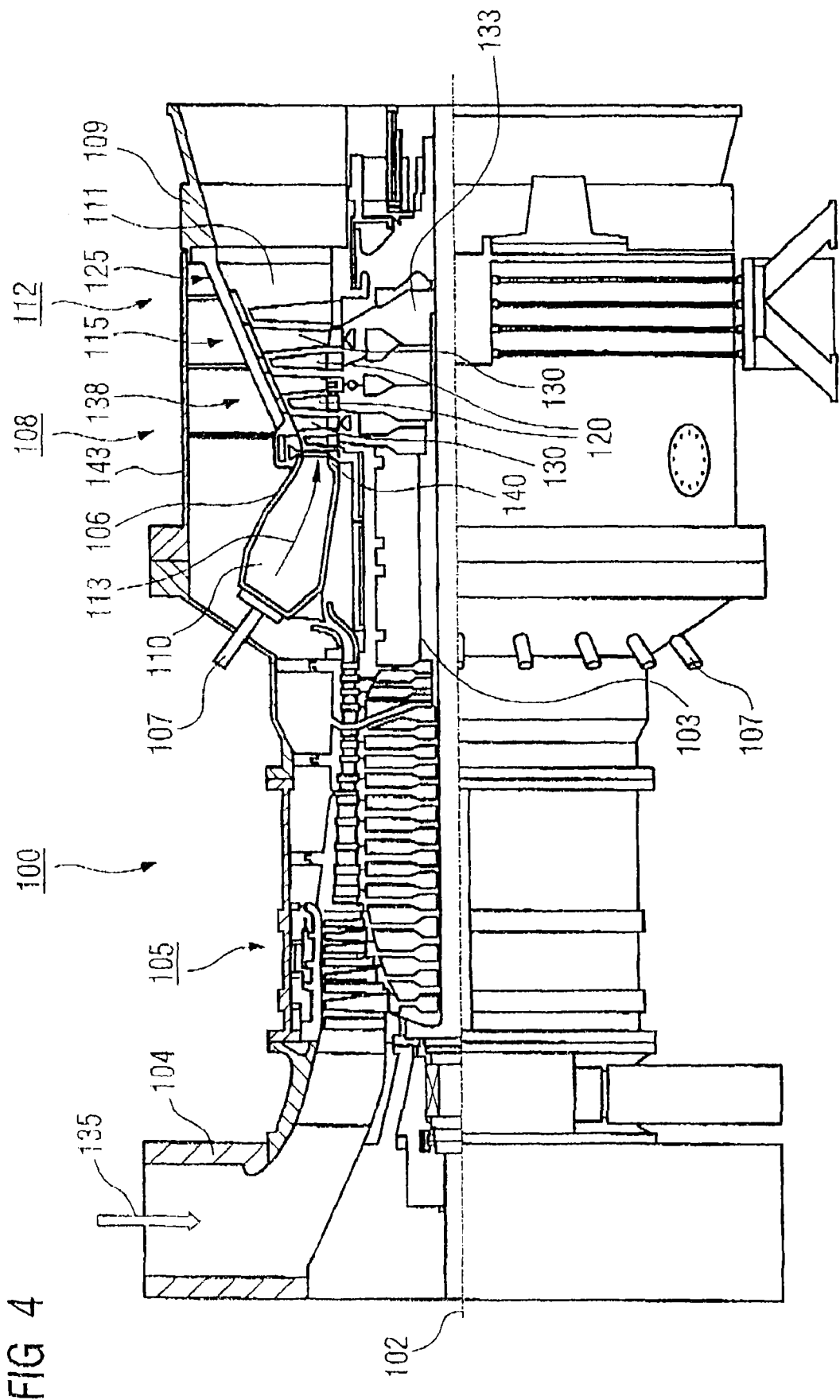
FIG. 4 depicts a gas turbine.

FIG. 4 depicts an example of a gas turbine 100 in a longitudinal partial section. In its interior, the gas turbine 100 has a rotor 103 rotatably mounted around a rotational axis 102 with a shaft 101, and is also designated as a turbine rotor. Following in succession along the rotor 103 are an intake housing 104, a compressor 105, for example, a torus-like combustion chamber 110, in particular, an annular combustion chamber, with several coaxially arranged burners 107, a turbine 108 and the exhaust gas housing 109. The annular combustion chamber 110 communicates with, for example, an annular, hot-gas channel 111. Four series connected turbine stages 112 form the turbine 108 there, for example. Every turbine stage 112 is formed, for example, from two blade rings. Viewed in the flow direction of a working medium 113, a row 125 formed of rotor blades 120 follows in the hot-gas channel 111 of a guide blade row 115.

The guide blades 130, in this case, are fastened in an internal housing 138 of a stator 143, whereas the rotor blades 120 of a row 125 are attached to the rotor 103 by means of a turbine disk 133, for example. Coupled to the rotor 103 is a generator or a work machine (not shown).

During operation of the gas turbine 100, air 135 is suctioned by the compressor 105 through the intake housing 104 and compressed. The compressed air made available on the turbine-side end of the compressor 105 is conveyed to the burners 107 and mixed there with a combustion means. The mixture is then burned in the combustion chamber 110 with the formation of the working medium 113. From there, the working medium 113 flows along the hot-gas channel 111 past the guide blades 130 and the rotor blades 120. At the rotor blades 120, the working medium 113 expands transmitting an impulse so that the rotor blades 120 drive the rotor 103 and this drives the work machine coupled therewith.

The components exposed to the hot working medium 113 are subject to thermal stress during operation of the gas turbine 100. The guide blades 130 and rotor blades 120 of the first turbine stage 112, as viewed in the flow direction of the working medium 113, are subject to the most thermal stress besides the heat shield elements lining the annular combustion chamber 110. In order to withstand the temperatures prevailing there, they can be cooled with a cooling medium. Likewise, the substrates of the components may have a directionally solidified structure, i.e., they are monocrystalline (SX structure) or have only longitudinal oriented grains (DS structure). For example, iron-based, nickel-based or cobalt-based super alloys are used as the material for the components, in particular, for the turbine blades 120, 130 and components of the combustion chamber 110. These types of super alloys are known, for example, as EP 1 204 776 B1, EP 1 306 454, EP 1 319 729 Al, WO 99/67435 or WO 00/44949.

Likewise, the blades 120, 130 may have coatings against corrosion (MCrAlX; M is at least one element from the group of iron (Fe), cobalt (Co), nickel (Ni), X is an active element and stands for yttrium (Y) and/or silicon, scandium (Sc) and/or at least one element from the rare earths or hafnium). These types of alloys are known as EP 0 486 489 B1, EP 0 786 017 B1, EP 0 412 397 B1 or EP 1 306 454 A1, which are part of this disclosure with respect to the chemical composition.

A thermal barrier coating may be present on the MCrAlX, and is made, for example, of $ZrO_2$, $Y_2O_3$—$ZrO_2$, i.e., it is not partially or completely stabilized by yttrium oxide and/or calcium oxide and/or magnesium oxide. Columnar grains are formed in the thermal barrier coating by using suitable coating methods such as, for example, electron-beam physical vapor deposition (EB-PVD).

The guide blade 130 has a guide blade root (not shown here) facing the internal housing 138 of the turbine 108 and a guide blade head opposite from the guide blade root. The guide blade head is facing the rotor 103 and fixed on a fastening ring 140 of the stator 143.

The invention claimed is:

1. A method for a soldering repair of a component, comprising the steps of:
    repairing the component by soldering the component with a solder in a processing chamber, wherein the soldering includes:
        adjusting an oxygen partial pressure of less than $3.5*10^{-6}$ mbar and greater than $10^{-7}$ mbar in the processing chamber; and
        adjusting a total process pressure of less than 10 mbar and greater than 0.035 mbar in the processing chamber.

2. The method according to claim 1, wherein prior to a heating of the component in the processing chamber with the solder a flushing of the processing chamber with an inert gas is performed.

3. The method according to claim 2, wherein a throughput during the flushing lies between 0.21/min and 1 l/min.

4. The method according to claim 3, wherein the throughput is 1 l/min.

5. The method according to claim 2, wherein an inert gas is filtered though a gas cleaning cartridge before entering the processing chamber.

6. The method according to claim 1, wherein the component features a nickel-based alloy.

7. The method according to claim 1, wherein the soldering is conducted isothermally.

8. The method according to claim 1, wherein the soldering is conducted in a temperature-gradient method.

9. The method according to claim 1, wherein the solder is directionally solidified.

10. The method according to claim 1, wherein the solder is nickel-based.

11. The method according to claim 10, wherein the solder features chromium, cobalt and tungsten.

12. The method according to claim 10, wherein the solder contains zirconium.

13. The method according to claim 10, wherein the solder contains scandium.

14. The method according to claim 10, wherein the solder contains zirconium and does not contain any scandium.

15. The method according to claim 10, wherein the solder contains scandium and does not contain any zirconium.

16. The method according to claim 10, wherein the solder contains zirconium and scandium.

* * * * *